US006971181B2

(12) United States Patent
Ohm et al.

(10) Patent No.: US 6,971,181 B2
(45) Date of Patent: Dec. 6, 2005

(54) DIGITAL DISPLAY COMPASS FOR MOUNTING ON VEHICLE REAR VIEW MIRROR

(75) Inventors: Patrick L. Ohm, Mesa, AZ (US); Robert A. Horn, Scottsdale, AZ (US); Hong-Chung Chang, Kowloon (CN)

(73) Assignee: Bell Automotive Products, Inc., Scottsdale, AZ (US)

( * ) Notice: Subject to any disclaimer, the term of this patent is extended or adjusted under 35 U.S.C. 154(b) by 0 days.

(21) Appl. No.: 10/775,750

(22) Filed: Feb. 9, 2004

(65) Prior Publication Data

US 2005/0172504 A1   Aug. 11, 2005

(51) Int. Cl.[7] .............................................. G01C 17/02
(52) U.S. Cl. ..................... 33/355 R; 33/356; 33/333
(58) Field of Search ............................... 33/355 R, 300, 33/324, 356, 357–359, 333, 347, 354

(56) References Cited

U.S. PATENT DOCUMENTS

| | | | | |
|---|---|---|---|---|
| 1,772,439 A | * | 8/1930 | Garbs ........................ 248/205.5 |
| 2,790,617 A | * | 4/1957 | Harland ..................... 248/278.1 |
| 3,978,591 A | * | 9/1976 | Jaaskelainen ................. 33/334 |
| 4,309,828 A | * | 1/1982 | Sakamoto .................. 33/355 R |
| 4,425,717 A | * | 1/1984 | Marcus ......................... 33/361 |
| 4,453,285 A | * | 6/1984 | van Rosberg ................. 15/164 |
| 4,581,827 A | * | 4/1986 | Higashi ........................ 33/333 |
| 4,851,775 A | | 7/1989 | Kim et al. ................... 324/247 |
| 5,106,177 A | * | 4/1992 | Dolasia ....................... 359/876 |
| 5,169,257 A | * | 12/1992 | Liou ............................ 403/95 |
| 5,187,871 A | * | 2/1993 | McDermott .................. 33/354 |
| 5,239,264 A | | 8/1993 | Hawks ........................ 324/253 |
| 5,429,481 A | * | 7/1995 | Liu ............................. 416/246 |
| 5,455,716 A | * | 10/1995 | Suman et al. ................ 359/838 |
| 5,528,837 A | | 6/1996 | Hartmann et al. ............. 33/356 |
| 6,047,237 A | * | 4/2000 | Michmerhuizen ........... 701/224 |
| 6,140,933 A | * | 10/2000 | Bugno et al. ............. 340/693.5 |
| 6,172,613 B1 | * | 1/2001 | DeLine et al. ........... 340/815.4 |
| 6,217,181 B1 | * | 4/2001 | Lynam et al. ............... 359/879 |
| 6,218,934 B1 | * | 4/2001 | Regan ......................... 340/438 |
| 6,243,003 B1 | * | 6/2001 | DeLine et al. ........... 340/425.5 |
| 6,742,270 B2 | * | 6/2004 | Chih ........................ 33/355 R |
| 2003/0127513 A1 | * | 7/2003 | DeVries et al. ............. 235/380 |
| 2003/0236622 A1 | * | 12/2003 | Schofield .................... 701/216 |
| 2004/0032675 A1 | * | 2/2004 | Weller et al. ............... 359/872 |
| 2004/0199310 A1 | * | 10/2004 | DeLine et al. ................ 701/36 |
| 2004/0207940 A1 | * | 10/2004 | Carter et al. ................ 359/879 |

* cited by examiner

Primary Examiner—Christopher W. Fulton
Assistant Examiner—Yaritza Guadalupe
(74) Attorney, Agent, or Firm—Baker Botts L.L.P.

(57) ABSTRACT

A digital display compass for mounting on vehicle rear view mirrors, including a direction sensor module generating signals corresponding to a direction that it is facing attached to the inside of the vehicle windshield, an electronic housing attached to the back side of the rear view mirror, and a digital display attached to the front side of the rear view mirror. A flexible transmission cord extends from the directional sensor module to the electronic housing, and transmits the signals from the direction sensor module. The electronic housing contains a battery power source and electronics for converting the signals received from the transmission cord to drive a digital display representative of the direction sensed by the direction sensor module. A flexible cable extends from the back side of the mirror to the front side of the mirror and provides electronic communication from the electronic housing to the digital display.

7 Claims, 1 Drawing Sheet

DIGITAL DISPLAY COMPASS FOR MOUNTING ON VEHICLE REAR VIEW MIRROR

BACKGROUND OF THE INVENTION

1. Field of the Invention

The present invention is directed to an after market accessory for vehicles, more particularly a digital display compass which can be readily mounted on the rear view mirror of the vehicle simulating the digital display compass feature available as an original equipment accessory.

2. Background Art

Compasses have long been an accessory for vehicles, and may even have first been available as an after market accessory. Hartmann et al. U.S. Pat. No. 5,528,837 issued Jun. 25, 1996, for example, discloses a magnetic dial compass that may be attached to a vehicle. More recently, digital display compasses have become popular and are included as a high end, original equipment feature in which the direction that the vehicle is traveling is displayed in a small, corner portion of the rear view mirror adjacent the front windshield of the vehicle. After market digital display compass accessories that may be mounted on the vehicle dashboard, or the vehicle windshield are old in the art. There remains a need, however, for a after market digital display compass that can be readily attached by the consumer to provide a display in a small corner of the rear view mirror simulating the feature available as an original equipment accessory from the manufacturer of the vehicle.

SUMMARY OF THE INVENTION

The present invention is directed to a digital display compass for mounting on vehicle rear view mirrors, in which the vehicle has a windshield having an inside surface, the rear view mirror is disposed adjacent the inside surface of the windshield, and the rear view mirror has a back side, which is oriented toward the windshield, and a front side, including the mirror surface, which is oriented toward a driver of the vehicle. The digital display compass of the present invention comprises a direction sensor module that is attached to the inside of the vehicle windshield and generates signals corresponding to a direction that it is facing, an electronic housing that is attached to the back side of the rear view mirror, and a digital display that is attached to the front side of the rear view mirror. A flexible transmission cord extends from the directional sensor module to the electronic housing, and transmits the signals from the direction sensor module. The electronic housing contains a battery power source and electronics for converting the signals received from the transmission cord to drive a digital display representative of the direction sensed by the direction sensor module. A flexible cable extends from the back side of the mirror to the front side of the mirror and provides electronic communication from the electronic housing to the digital display.

DETAILED DESCRIPTION

Figure 1:
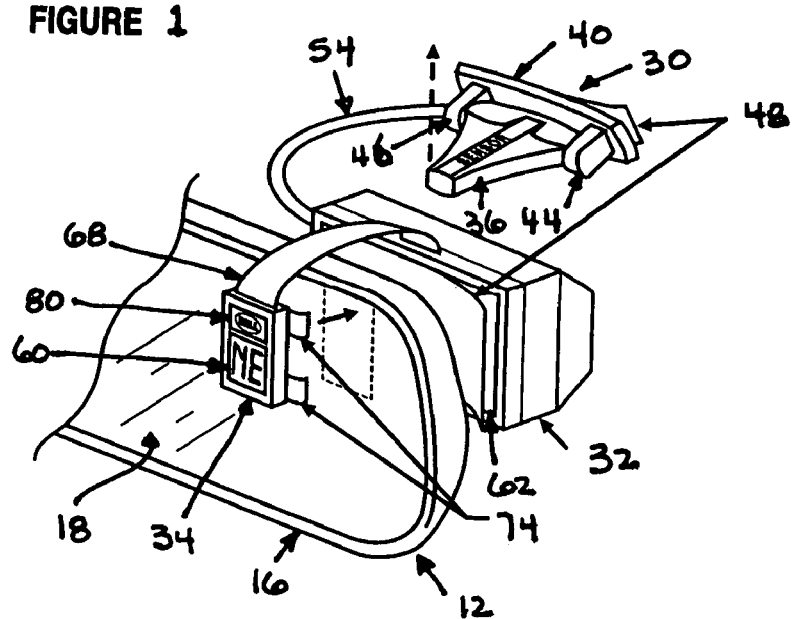
FIG. 1 is a perspective view of a digital display compass according to the present invention being mounted on the rear view mirror of a vehicle.

While this invention is susceptible of embodiment in many different forms, a particular embodiment of the invention is shown in the drawings, with the understanding that the present disclosure is intended to be considered as an exemplification of the principles of the invention, and is not intended to limit the invention to the embodiment illustrated. For convenience of illustration and description, like reference numerals are used for like parts throughout the several views.

In the perspective illustration of FIG. 1, a digital display compass assembly 10 according to the present invention is being mounted to a vehicle rear view mirror 12, which is partially illustrated. Mirror 12 has a back side 14 and a front side 16, which includes mirror surface 18. The vehicle has a front windshield 20, which has an inside surface 22. In the embodiment of the present invention illustrated in FIG. 2, mirror 12 is attached directly to the inside surface 22 of windshield 20 by a universal joint member 24. It will, however, be appreciated by those skilled in the art that the rear view mirror may be disposed adjacent inside surface 22 of windshield 20 without direct attachment to the windshield. For example, the rear view mirror may depend from the inside of the roof of the vehicle. Generally, some provision is made for adjustment of the rear view mirror by the driver of the vehicle.

Figure 2:
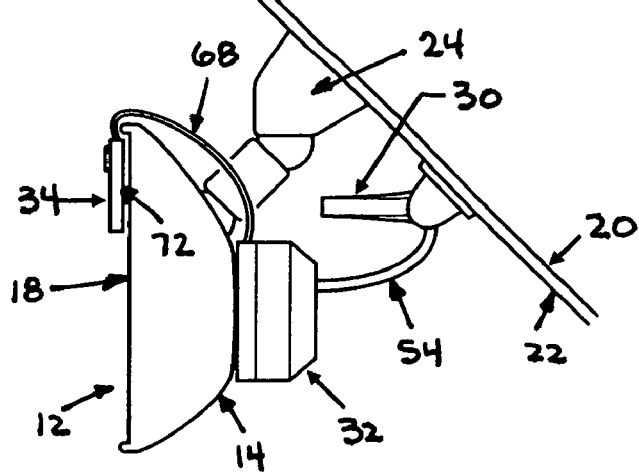
FIG. 2 is a side elevation view of the digital display compass of the present invention mounted to the rear view mirror of a vehicle.
Figure 3:
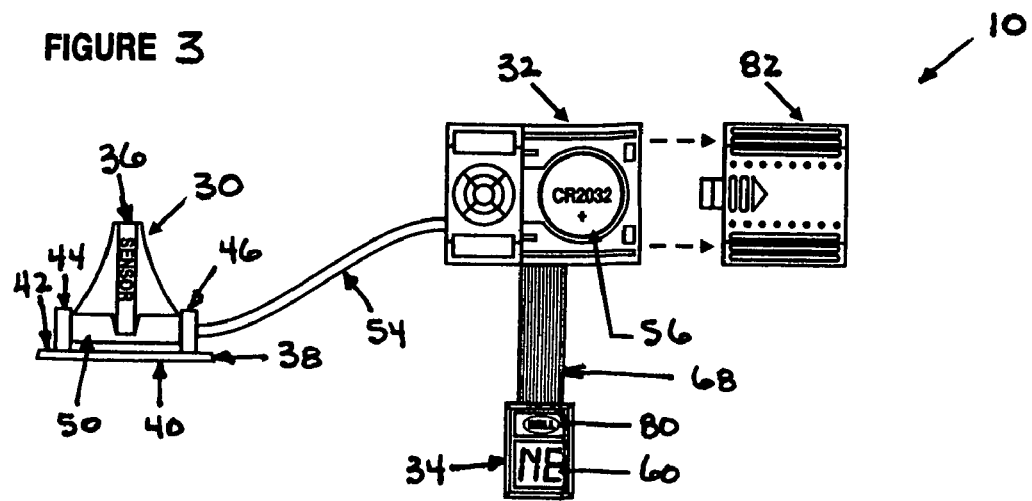
FIG. 3 is a top plan view of a digital display compass according to the present invention.

As is illustrated in each of FIGS. 1–3, the digital display compass assembly 10 includes a directional sensor module 30, an electronic housing 32 and a display portion 34. Sensor module 30 has a sensor arm 36 which includes magnetic sensing coils and circuits, such as those disclosed in PNI Corporation's U.S. Pat. Nos. 4,851,775 and 5,239,264, responsive to the earth's magnetic field, and which provide oscillating signal outputs based on the orientation of the sensor. Directional sensor module 30 includes a plate 38 having a back side 40 and a front side 42. When attached to windshield 20, back side 40 of plate 38 is adjacent inside surface 22 of the windshield. Plate 38 may be attached directly to windshield 20 by an adhesive (not shown), on the back side 40 of plate 38, that is conveniently used for such applications and is intended to withstand temperatures of 200 degrees F., which can occur within a vehicle in certain parts of the United States of America. To facilitate packaging of the digital display compass, an adhesive release liner 48 is placed over the adhesive on back side 40 of plate 38. As an alternative, to facilitate temporary removal of the directional sensor module 30 from windshield 20, hook and loop fastening tapes may be used. In such an alternative, one of the hook and loop mating tapes is adhered to back side 40 while the other mating portion of the tape is provided with the previously mentioned adhesive on its reverse side, and covered with an adhesive release liner 48.

Front side 42 of plate 38 has a pair of spaced apart tabs 44 and 46. As may be readily appreciated from particularly FIGS. 1 and 3, sensor arm 36 is somewhat "T" shaped and has a horizontal bar portion 50 extending between tabs 44 and 46. More particularly, sensor arm 36 is mounted for pivotal movement relative to inside surface 22 of the windshield, between tabs 44 and 46 between approximately 180 degrees, and is frictionally retainable in a user selected position within the approximately 180 degrees of pivotal movement available. Any one of a number of conventional devices, such as face ratchets, or even plane surfaces of materials having a high coefficient of friction, may be used to provide the frictional engagement. The purpose of the frictionally retainable pivotal positioning of sensor arm 36 is that it should be oriented as close to parallel to the road on which the vehicle is traveling as is possible for optimum functioning of the directional sensor. Thus, once plate 38 is mounted on windshield 20, sensor arm 36 may be pivotally adjusted by the consumer to orient sensor arm 36 as parallel to the road as possible. Extending through an aperture (not shown) in tab 46 is a transmission cord 54 which conveys the oscillating signal output of directional sensor module 30 to electronic housing 32.

Contained within electronic housing 32 is a battery power source 56 and electronics, including a microprocessor, (not shown) for converting the directional sensor signal transmitted by cord 54 in order to drive a digital display readout on display 34 of one of eight points of the compass, mainly N, NW, W, SW, S, SE, E, NE, the latter of which is illustrated as 60 in FIGS. 1 and 3. The microprocessor also provides additional features such as an automatic shutoff to conserve power. Housing 32 is attached to back side 14 of mirror 12 in a manner similar to that described for the attachment of directional sensor module 30 to windshield 20. Again, attachment of housing 32 may be directly by an adhesive 62, which is covered by an adhesive release liner 48, or mating hook and loop fastening tapes may be employed between housing 32 and mirror 12 to facilitate temporary removal and reattachment of the housing. Extending between electronic housing 32 and display 34 is a flexible conductor of electronic signals which is illustrated in the present embodiment as a ribbon tape or flat cable 68.

Display 34 is attached, preferably, to an upper corner portion of mirror surface 18, on the opposite side of rear view mirror 12 to which electronic housing 32 is attached. Adhesive strips (not shown) mounted on the back side 72 of display 34 are used to attach the display directly to mirror surface 18, after adhesive release liners 74 are taken off by the consumer. Flat cable 68 fits over, and may be conformed to, the top of mirror 12. As a result, electronic housing 32 is hidden from view, connecting cable 68 is unobtrusive and the digital display in a small corner portion of the mirror simulates the feature available as original equipment from the manufacturer of the vehicle.

Because of the flexible cable connection between display 34 and electronic housing 32, as well as the flexible transmission cord 54, and the adjustable positioning of sensor arm 36 of directional sensor module 30, it will be readily appreciated that the digital display of the present invention may be readily attached by a consumer to virtually any vehicle. Moreover, mirror 12 may readily adjusted without requiring repositioning or reattachment of any of sensor module 30, electronic housing 32, or display 34.

As is best illustrated in FIGS. 1 and 3, immediately above the actual directional display 60 there is an actuator or button 80, which may be depressed by the consumer to, through the microprocessor in housing 32, operate various features, including calibration of the digital display compass of the present invention. As first installed in a vehicle, or if sensor module 30 is moved, it is necessary to calibrate the compass. Such calibration is accomplished by depressing an actuator or button 80 for approximately four (4) seconds, and the vehicle is then driven through approximately one and one-half circles in a consumer selected one of the clockwise or, counter clockwise, directions. It is not, however, necessary to recalibrate the compass if the position of rear view mirror 12 is readjusted, because such readjustment can be accomplished with present invention without having to reposition, or otherwise move, sensor module 30.

An actuator or button 80 is also used to activate a back light feature for the display, as well as to overcome the automatic shut off feature of the display which is activated to conserve power whenever the vehicle has proceeded in the same one of the eight compass directions for an amount of time predetermined by the manufacturer of the compass. Pressing and then releasing an actuator or button 80 will overcome that automatic shut off feature.

In order to facilitate replacement of battery 56 should that become necessary, electronic housing 32 is provided with a removable battery door 82, which as illustrated in FIG. 3 may be slid open to obtain access to battery 56. It will be appreciated from the illustrations in the drawings that battery door 82 is readily accessible to the consumer without having to remove electronic housing 32 from mirror 12.

While a particular embodiment of the invention has been shown and described, alternatives, variations and modifications will occur to those skilled in the art. It is intended in the appended claims to cover all such alternatives, variations and modifications as come within true spirit and scope of the present invention.

What is claimed as new and desired to be secured by Letters Patent is:

1. An aftermarket digital display compass accessory for mounting on an existing rear view mirror of a vehicle, in which the vehicle has a windshield having an inside surface, the rear view mirror is disposed adjacent the inside surface of the windshield, and the rear view mirror has a back side, which is oriented toward the windshield, and a front side, including the mirror surface, which is oriented toward a driver of the vehicle, comprising:
   a direction sensor module that is attached directly to the inside of the vehicle windshield and generates signals corresponding to a direction that it is facing;
   an electronic housing that is attached directly to the back side of the rear view mirror, on the back side of the rear view mirror;
   a digital display portion that is attached directly to the front side of the rear view mirror, on the front side of the rear view mirror;
   a flexible transmission cord extending from the directional sensor module to the electronic housing, and transmitting the signals from the direction sensor module;
   the electronic housing containing a battery providing a power source and electronics for converting the signals received from the transmission cord to drive a digital display representative of the direction sensed by the direction sensor module; and
   a flexible cable extending from the back side of the mirror to the front side of the mirror and providing electronic communication from the electronic housing to the digital display.

2. The digital display compass according to claim 1 in which the directional sensor is mounted for selectable positioning relative to the inside of the vehicle windshield.

3. The digital display compass according to claim 1 in which the directional sensor module includes:
   a plate attached to the inside of the vehicle windshield;
   the plate having a pair of spaced apart tabs opposite the vehicle windshield; and
   a sensor arm mounted between the tabs for pivotal movement relative to the vehicle windshield.

4. The digital display compass according to claim 3 in which frictional engagement between the sensor arm and at least one of the tabs facilitates selectable pivotal positioning relative to the inside of the vehicle windshield.

5. The digital display compass according to claim 1 in which the flexible cable extending from the back side of the mirror to the front side of the mirror also provides electronic communication from the digital display to the electronic housing.

6. The digital display compass according to claim 5 in which the electronics contained in the housing provide at least one feature, in addition to the digital display representative of the direction sensed by the direction sensor module, and the digital display portion carries an actuator for selecting the at least one feature.

7. The digital display compass according to claim 1 in which the flexible cable extending from the back side of the mirror to the front side of the mirror is flat.

* * * * *